United States Patent
Padala et al.

(10) Patent No.: US 9,363,192 B2
(45) Date of Patent: Jun. 7, 2016

(54) AUTOMATIC REMEDIATION IN A DISTRIBUTED COMPUTER SYSTEM WITH MULTIPLE CLUSTERS OF HOST COMPUTERS

(71) Applicant: VMware, Inc., Palo Alto, CA (US)

(72) Inventors: Pradeep Padala, Sunnyvale, CA (US); Parth Shah, Mountain View, CA (US); Ajay Gulati, Palo Alto, CA (US); Aastha Bhardwaj, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 263 days.

(21) Appl. No.: 14/069,273

(22) Filed: Oct. 31, 2013

(65) Prior Publication Data
US 2015/0120931 A1   Apr. 30, 2015

(51) Int. Cl.
*H04L 12/911*    (2013.01)
*G06F 9/50*    (2006.01)

(52) U.S. Cl.
CPC ............... *H04L 47/70* (2013.01); *G06F 9/5027* (2013.01); *G06F 9/5077* (2013.01)

(58) Field of Classification Search
CPC ... H04L 47/70; H04L 41/145; H04L 41/5003; H04L 41/5019; H04L 67/025; H04L 67/10; H04L 67/18; G06F 11/0709; G06F 11/0727; G06F 9/50
See application file for complete search history.

(56) References Cited

U.S. PATENT DOCUMENTS

| 7,302,608 | B1 * | 11/2007 | Acharya | G06F 11/2041 714/13 |
| 9,009,542 | B1 * | 4/2015 | Marr | G06F 11/0709 714/47.1 |
| 2014/0082407 | A1 * | 3/2014 | Kochut | H04L 41/00 714/2 |
| 2015/0039764 | A1 * | 2/2015 | Beloglazov | H04L 47/70 709/226 |

FOREIGN PATENT DOCUMENTS

WO    WO 2013071125 A1 *  5/2013  ..........  G06F 11/0793

OTHER PUBLICATIONS

Mills et al., "Comparing VM-Placement Algorithms for On-Demand Clouds", 2011 Third IEEE International Conference on Cloud Computing Technology and Science, pp. 91-98.*
VMware vCloud Director, 2011; http://www.vmware.com/products/vcloud-director/overview.html.
Gulati et al.; "VMware Distributed Resource Management: Design, Implementation, and Lessons Learned"; In VMware Technical Journal, Mar. 2012.
Gulati et al.; "dweights: Taming the Multi-Headed Monster for VM Placement in the Cloud"; In RADIO, 2011.

* cited by examiner

*Primary Examiner* — Michael C Lai

(57) ABSTRACT

A system and method for performing automatic remediation in a distributed computer system with multiple clusters of host computers uses the same placement selection algorithm for initial placements and for remediation placements of clients. The placement selection algorithm is executed to generate a placement solution when a remediation request in response to a remediation-requiring condition in the distributed computer system for at least one client running in one of the multiple clusters of host computers is detected and a remediation placement problem for the client is constructed. The placement solution is then implemented for the client for remediation.

21 Claims, 6 Drawing Sheets

AUTOMATIC REMEDIATION IN A DISTRIBUTED COMPUTER SYSTEM WITH MULTIPLE CLUSTERS OF HOST COMPUTERS

BACKGROUND

Placement of resource-consuming clients, such as virtual machines (VMs), on the right host devices in a distributed computer system is an important factor in efficiently utilizing physical resources in the distributed computer system. An effective client placement strategy must meet the requirements of the clients and optimize several, sometimes conflicting, goals, while taking into consideration the complexities of the distributed computer system.

After the clients have been properly placed on the appropriate host devices in the distributed computer system, some of these clients may have to be moved to different host devices for various reasons. As an example, one or more physical components of the distributed computer system may fail, which may reduce the amount of available resources for the clients at their current host devices. As another example, the performance of one or more physical components of the distributed computer system may degrade over time, which may affect the ability of the clients to meet their performance goals at their current host devices.

In these situations, the clients may need to be manually moved from their current host devices to other host devices that can satisfy the requirements of the clients. However, determining which host devices in the distributed computer system satisfy the requirements of the clients and manually moving the clients to those host devices can be complex and challenging due to the numerous parameters to consider.

SUMMARY

A system and method for performing automatic remediation in a distributed computer system with multiple clusters of host computers uses the same placement selection algorithm for initial placements and for remediation placements of clients. The placement selection algorithm is executed to generate a placement solution when a remediation request in response to a remediation-requiring condition in the distributed computer system for at least one client running in one of the multiple clusters of host computers is detected and a remediation placement problem for the client is constructed. The placement solution is then implemented for the client for remediation.

A method for performing automatic remediation in a distributed computer system with multiple clusters of host computers in accordance with an embodiment of the invention comprises receiving a remediation request in response to a detection of a remediation-requiring condition in the distributed computer system for at least one client running in one of the multiple clusters of host computers, constructing a remediation placement problem for the client, executing a placement selection algorithm for the remediation placement problem to generate a placement solution for the client, the placement selection algorithm being the same placement selection algorithm used for initial placements of new clients in the distributed computer system, and implementing the placement solution for the client for remediation. In some embodiments, the steps of this method are performed when program instructions contained in a computer-readable storage medium is executed by one or more processors.

A cloud management server for a distributed computer system in accordance with an embodiment of the invention comprises a cloud placement engine and a placement controller. The cloud placement engine is configured to generate placement solutions for clients to be placed in clusters of host computers in the distributed computer system using a placement selection algorithm in response to received placement problem. The placement selection algorithm is the same placement selection algorithm used for initial placements of new clients into the distributed computer system and for remediation placements of existing clients in the distributed computer system. The placement controller is operably connected to the cloud placement engine. The placement controller configured to receive a remediation request in response to a detection of a remediation-requiring condition in the distributed computer system for at least one client running in one of the clusters of host computers, construct a remediation placement problem for the client to be solved by the cloud placement engine, and implement a placement solution for the remediation problem provided by the cloud placement engine for remediation.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
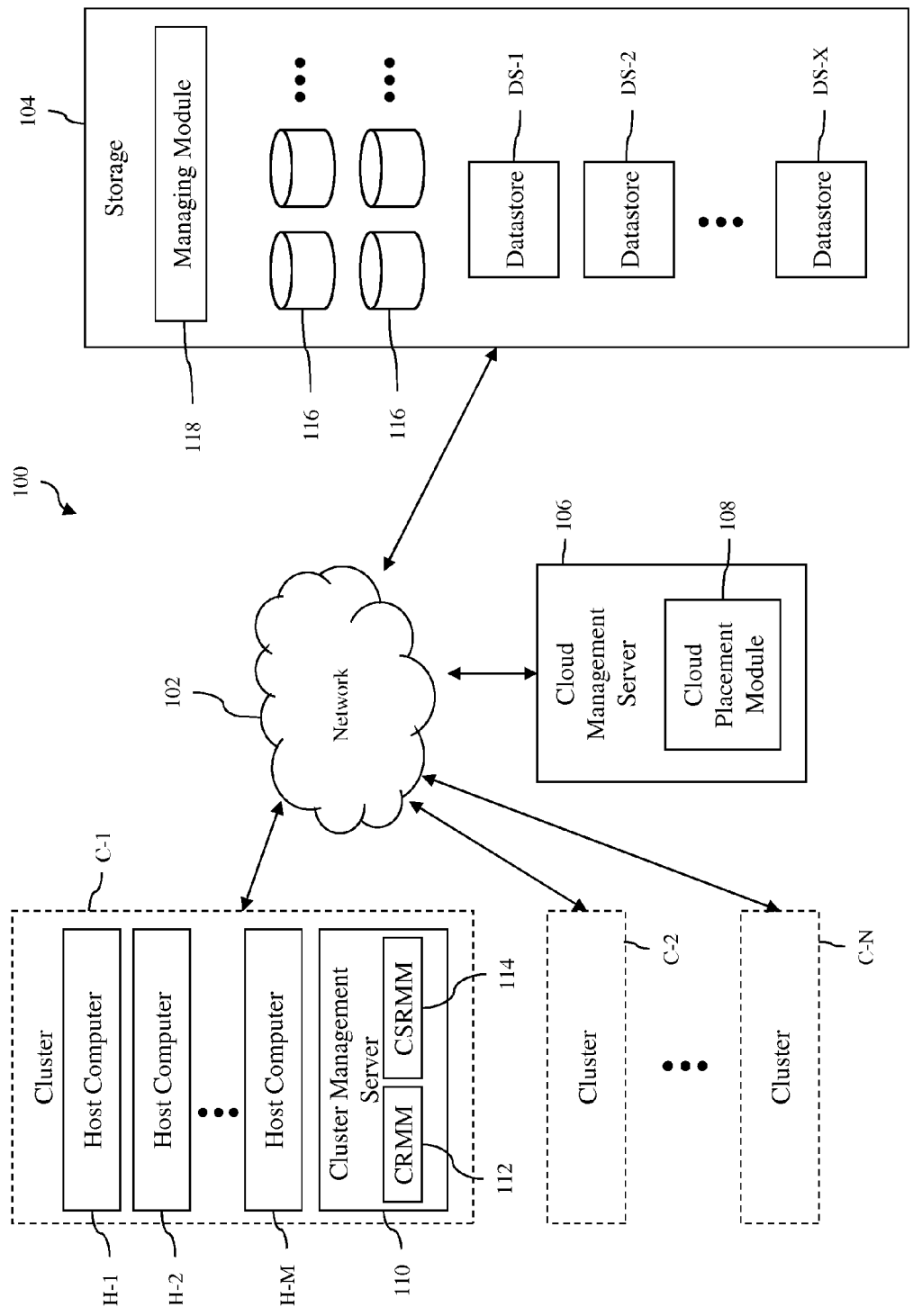
FIG. 1 is a block diagram of a distributed computer system in accordance with an embodiment of the invention.

Turning now to FIG. 1, a distributed computer system 100 in accordance with an embodiment of the invention is shown. As shown in FIG. 1, the distributed computer system includes a network 102, clusters C-1, C-2 . . . C-N (where N is a positive integer) of host computers, storage 104 and a cloud management server 106 with a cloud placement module 108. The exact number of host computer clusters included in the distributed computer system can be from few clusters to tens of clusters or more. The host computers of the different clusters, the storage and the cloud management server are connected to the network. Thus, each of the host computers in the clusters is able to access the storage via the network and may share the resources provided by the storage with the other host computers. Consequently, any process running on any of the host computers may also access the storage via the network.

In the illustrated embodiment, each of the clusters C-1, C-2 . . . C-N includes a number of host computers H-1, H-2 . . . H-M (where M is a positive integer) and a cluster management server 110 with a cluster resource management module (CRMM) 112 and a cluster storage resource management module (CSRMM) 114. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in datacenters. As an example, the host computers may be servers installed in one or more server racks. Typically, the host computers of a cluster are located within the same server rack.

Figure 2:
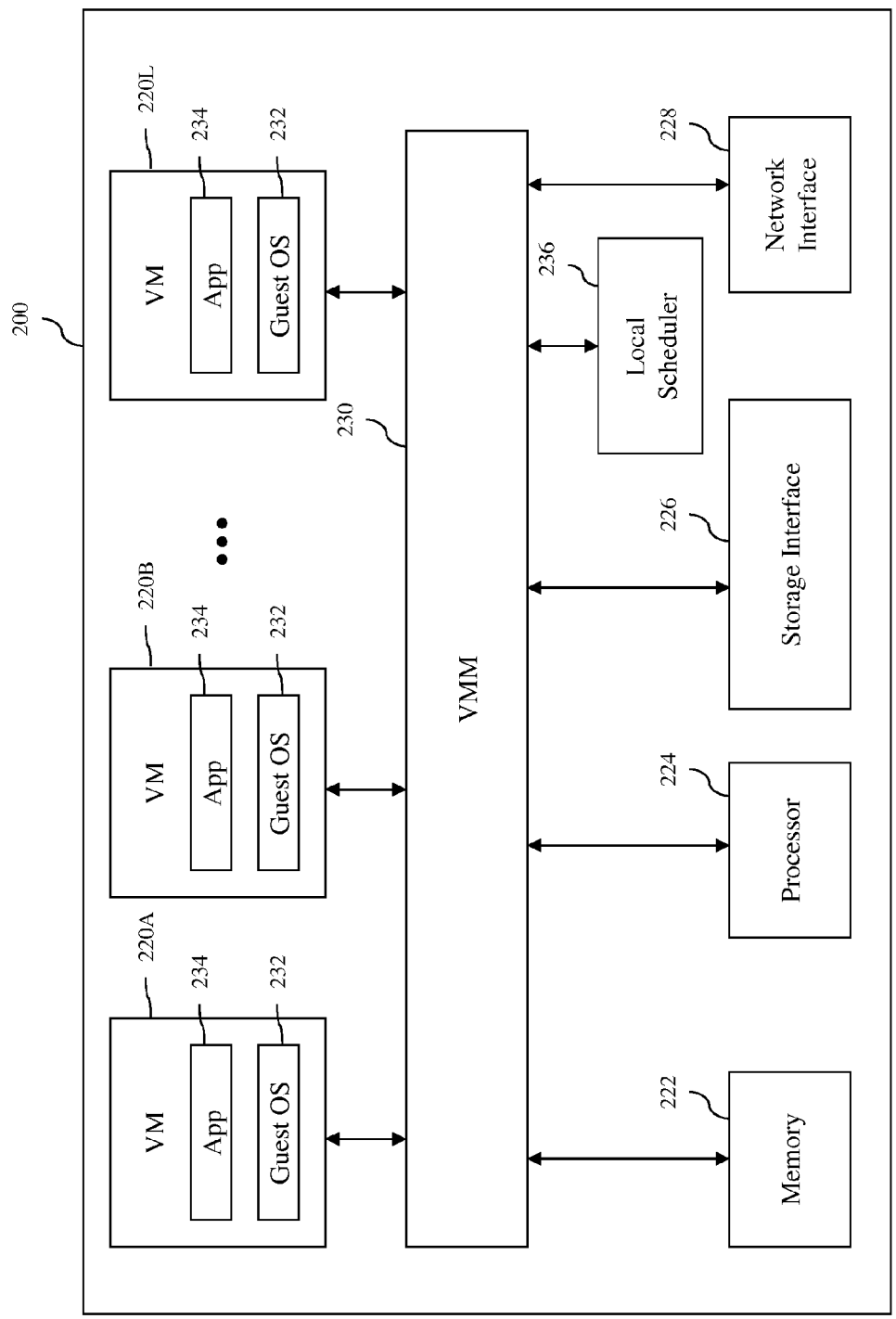
FIG. 2 is a block diagram of a host computer in accordance with an embodiment of the invention.

Turning now to FIG. 2, components of a host computer 200 that is representative of the host computers H-1, H-2 . . . H-M in accordance with an embodiment of the invention are shown. In FIG. 2, the physical connections between the various components of the host computer are not illustrated. In the illustrated embodiment, the host computer is configured to support a number of clients 220A, 220B . . . 220L (where L is a positive integer), which are VMs. The number of VMs supported by the host computer can be anywhere from one to more than one hundred. The exact number of VMs supported by the host computer is only limited by the physical resources of the host computer. The VMs share at least some of the hardware resources of the host computer, which include system memory 222, one or more processors 224, a storage interface 226, and a network interface 228. The system memory 222, which may be random access memory (RAM), is the primary memory of the host computer. The processor 224 can be any type of a processor, such as a central processing unit (CPU) commonly found in a server. The storage interface 226 is an interface that allows that host computer to communicate with the storage 104. As an example, the storage interface may be a host bus adapter or a network file system interface. The network interface 228 is an interface that allows the host computer to communicate with other devices connected to the network 102. As an example, the network interface may be a network adapter.

In the illustrated embodiment, the VMs 220A, 220B . . . 220L run on top of a virtual machine monitor 230, which is a software interface layer that enables sharing of the hardware resources of the host computer 200 by the VMs. However, in other embodiments, one or more of the VMs can be nested, i.e., a VM running in another VM. For example, one of the VMs may be running in a VM, which is also running in another VM. The virtual machine monitor may run on top of the host computer's operating system or directly on hardware of the host computer. In some embodiments, the virtual machine monitor runs on top of a hypervisor that is installed on top of the hardware components of the host computer. With the support of the virtual machine monitor, the VMs provide virtualized computer systems that give the appearance of being distinct from the host computer and from each other. Each VM includes a guest operating system 232 and one or more guest applications 234. The guest operating system is a master control program of the respective VM and, among other things, the guest operating system forms a software platform on top of which the guest applications run.

Similar to any other computer system connected to the network 102, the VMs 220A, 220B . . . 220L are able to communicate with other computer systems connected to the network using the network interface 228 of the host computer 200. In addition, the VMs are able to access the storage 104 using the storage interface 226 of the host computer.

The host computer 200 also includes a local scheduler 236 that operates as part of a resource management system, such as VMware Distributed Resource Scheduler (DRS), to manage resource requests made by the VMs 220A, 220B . . . 220L. Although the local scheduler is illustrated in FIG. 2 as being separate from the virtual machine monitor 230, the local scheduler may be implemented as part of the virtual machine monitor. In some embodiments, the local scheduler is implemented as software programs running on the host computer. However, in other embodiments, the local scheduler may be implemented using any combination of software and hardware.

Turning back to FIG. 1, each of the cluster management servers 110 in the clusters C-1, C-2 . . . C-N operates to monitor and manage the host computers H-1, H-2 . . . H-M in the respective cluster. Each cluster management server may be configured to monitor the current configurations of the host computers and the clients running on the host computers, for example, virtual machines (VMs), in the respective cluster. The monitored configurations may include hardware configuration of each of the host computers, such as CPU type and memory size, and/or software configurations of each of the host computers, such as operating system (OS) type and installed applications or software programs. The monitored configurations may also include client hosting information, i.e., which clients, e.g., VMs, are hosted or running on which host computers. The monitored configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource parameter settings, such as demand, limit, reservation and share values for various resources, e.g., CPU, memory, network bandwidth and storage, which are consumed by the clients. The demands of the clients for the consumable resources are determined by the host computers hosting the clients by monitoring the current usage of resources by the clients, e.g., CPU processing usage, memory usage, network usage and/or storage usage, and provided to the respective cluster management server.

The cluster management servers 110 may also perform various operations to manage the clients and the host computers H-1, H-2 . . . H-M in their respective clusters. As illustrated in FIG. 1, in an embodiment, each cluster management server include the cluster resource management module (CRMM) 112, which can be enabled by a user, to perform resource allocations and load balancing in the respective cluster. The cluster resource management module operates to allocate available resources among clients running in the cluster based on a number of parameters, which may include predefined rules and priorities. The cluster resource management module may be configured to select an appropriate host computer in the cluster when a new client is to be added to the cluster. The cluster resource management module may be configured to power down particular clients and/or host computers in the cluster to conserve power. The cluster resource management module in the cluster management server may be configured or programmed to perform other operations to manage the cluster. Each cluster management server may also include the cluster storage resource management module (CSRMM) 114, which can be enabled by a user, to perform storage resource management for the respective cluster. The cluster storage resource management module enables client disk placements (e.g., VM disk placements) and migrations to balance space and I/O resources across datastores that are associated with the cluster via recommendations or automated operations.

In some embodiments, the cluster management servers 110 may be physical computers. In other embodiments, the cluster management servers may be implemented as software programs running on physical computers, such as the host computer 200 shown in FIG. 2, or virtual computers, such as the 220A, 220B . . . 220L. In an implementation, the cluster management servers are VMware vCenter™ servers with at least some of the features available for such servers, the resource management modules 112 in the cluster management servers are VMware Distributed Resource Schedulers and the storage resource management modules 114 in the cluster management servers are VMware Storage Distributed Resource Schedulers.

The network 102 can be any type of computer network or a combination of networks that allows communications between devices connected to the network. The network 102 may include the Internet, a wide area network (WAN), a local area network (LAN), a storage area network (SAN), a fibre channel network and/or other networks. The network 102 may be configured to support protocols suited for communications with storage arrays, such as Fibre Channel, Internet Small Computer System Interface (iSCSI), Fibre Channel over Ethernet (FCoE) and HyperSCSI.

The storage 104 is used to store data for the host computers of the clusters C-1, C-2 . . . C-N, which can be accessed like any other storage device connected to computer systems. In an embodiment, the storage can be accessed by entities, such as clients running on the host computers, using any file system, e.g., virtual machine file system (VMFS) or network file system (NFS). The storage includes one or more computer data storage devices 116, which can be any type of storage devices, such as solid-state devices (SSDs), hard disks or a combination of the two. At least some of these storage devices may be local storage devices of the host computers, e.g., locally attached disks or SSDs within the host computers. The storage devices may operate as components of a network-attached storage (NAS) and/or a storage area network (SAN). The storage includes a storage managing module 118, which manages the operation of the storage. In an embodiment, the storage managing module is a computer program executing on one or more computer systems (not shown) of the storage. The storage supports multiple datastores DS-1, DS-2 . . . DS-X (where X is a positive integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters C-1, C-2 . . . C-N. For virtual machines, the datastores may be used to store virtual storage, e.g., virtual disks, used by each of the virtual machines, as well as other files needed to support the virtual machines. One or more datastores may be associated with one or more clusters. The same datastore may be associated with more than one cluster.

The cloud management server 106 operates to monitor and manage the clusters C-1, C-2 . . . C-N to provide a cloud environment using the host computers H-1, H-2 . . . H-M in the clusters. The cloud management server allows users or customers to create and use virtual datacenters (VDCs) with specified resource requirements. One VDC may include clients running on different host computers that are part of different clusters. Thus, in a single cluster, a group of clients running on the host computers of that cluster may belong to one VDC, while the other clients running on the host computers of the same cluster may belong to other VDCs. It is also possible that, in a single host computer, one or more clients running on that host computer belong to one VDC, while the other clients running on the same host computer belong to other VDCs. The cloud management server performs operations to manage the VDCs supported by the distributed computer system. In some embodiments, the cloud management server may be a physical computer. In other embodiments, the cloud management server may be implemented as software program running on a physical computer or a VM, which may be part of one of the clusters C-1, C-2. . . C-N. In an implementation, the cloud management server is VMware vCloud-Director™ server with at least some of the features available for such a server.

The cloud placement module 108 in the cloud management server 106 operates to determine initial placement of new clients in the cloud environment provided by the distributed computer system 100, such as a VDC that includes multiple clusters. In addition, the cloud placement module also operates to determine relocation placement of existing clients in the distributed computer system 100 when a condition is detected that requires remediation. Examples of remediation-requirement conditions are described below. In an embodiment, the cloud placement module determines a candidate cluster of host computers in the distributed computer system appropriate for the initial placement of new clients and for the relocation placement of existing clients for remediation. The cloud placement module may also determine the datastore for the new or existing client for placement. In this embodiment, the cluster management server 110 in the selected cluster may select the appropriate host computer in the selected cluster for initial placement or for relocation placement of a client as part of a process for placing the client in a designated cluster. The cloud placement module may be implemented as software, hardware, firmware or any combination of software, hardware and/or firmware. In an exemplary embodiment, the cloud placement module is implemented as a software program installed in cloud management server 106.

Figure 3:
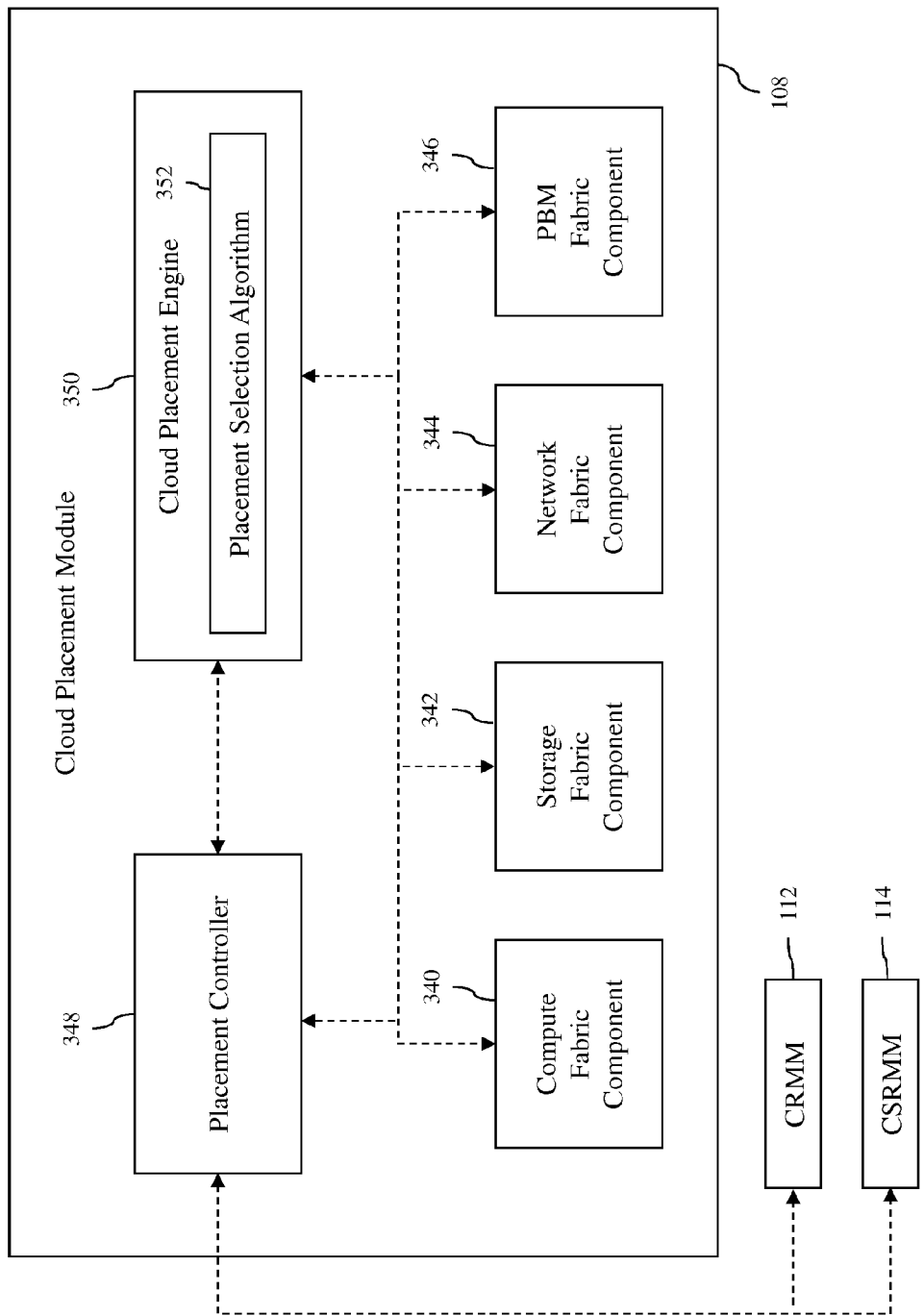
FIG. 3 is a block diagram of a cloud placement module included in the distributed computer system in accordance with an embodiment of the invention.

Turning now to FIG. 3, a block diagram of components of the cloud placement module 108 in accordance with an embodiment of the invention is illustrated. As shown in FIG. 3, the cloud placement module 108 includes a compute fabric component 340, a storage fabric component 342, a network fabric component 344, a policy based management (PBM) fabric component 346, a cloud placement engine 348 and a placement controller 350. These components of the cloud placement module may be implement in hardware, software, firmware or any combination of hardware, software and/or firmware. In one implementation, these components of the cloud placement module are implemented as one or more software programs installed in the cloud management server 106, which are executed by one or more processors associated with the cloud management server.

The compute fabric component, the storage fabric component, the network fabric component, the PBM fabric component operate to aggregate and manage the various resources in the distributed computer system 100. The compute fabric component aggregates the compute resources, e.g., the CPU and RAM resources, in the distributed computer system and manages these resources. The storage fabric component aggregates the storage resources in the distributed computer system and manages these resources. The network fabric component aggregates the network resources, i.e., network bandwidth, in the distributed computer system and manages these resources. The PBM fabric component aggregates policies in the distributed computer system and manages these resources. One of the policies may be the storage class for a virtual disk of a VM. For example, a datastore can be one of three user-defined storage classes: gold, silver and bronze. Other policies may include VM to VM affinity and anti-affinity policies. These rules can be at host level or at cluster level. A host level anti-affinity policy between two VMs will ensure that both VMs will be placed on different hosts. A cluster level affinity policy between two VMs will ensure that both VMs will be placed on hosts belonging to the same cluster.

The compute fabric component, the storage fabric component, the network fabric component and the PBM fabric component further operate to assist the cloud placement engine 350 in selecting a candidate cluster of host computers and/or a datastore in the distributed computer system 100 to place a new or existing client. In particular, when initiated, each fabric component analyzes a list of possible clusters to filter out ineligible clusters of host computers based on client requirements and returns an updated list of possible clusters for the client to be placed, as well as other information, such as resource utilization metrics.

In an embodiment, one of the fabric components generates a list of suitable clusters based on the client requirements for the resource handled by that fabric component. The remaining fabric components take turn pruning down the list of suitable clusters based on the client requirements for the respective resources handled by the fabric component. As a result, a final list of suitable clusters that meet all the resource (compute, storage, network and/or policy) constraints of the client to be placed is generated. The final list of suitable clusters along with utilization metrics for each resource can then be used for placement analysis by the cloud placement module.

As an example, a VM to be placed in the distributed computer system may require a gold storage profile and other resource requirements. A VM requiring a gold storage profile cannot be placed in a cluster that is connected only to datastores with silver or bronze storage profiles. Thus, the storage fabric component will create a list of clusters from all the possible clusters in the distributed computer system that does not include clusters only connected to datastores with silver or bronze storage profiles. For each remaining eligible cluster, the storage fabric component will return utilization metrics for the best datastore connected to that cluster. The compute fabric component can then remove clusters from the list of suitable clusters that do not include any host computers with the specific compute capabilities required by the client to be placed. Similarly, the network fabric component may remove clusters from the updated list of suitable clusters that do not have sufficient network bandwidth to support the specific network requirements of the VM to be placed. Lastly, the PBM fabric component may remove candidate clusters from the latest updated list of suitable clusters that do not satisfy one or more policy requirements of the VM.

The cloud placement engine 350 operates to select a candidate cluster and/or a candidate datastore using the information provided by the compute fabric component 340, the storage fabric component 342, the network fabric component 344 and the PBM fabric component 346 for each placement problem, which could be an initial placement problem or a relocation placement problem. The cloud placement engine makes the selection by ranking the clusters in the final list of suitable clusters based on resource utilization metrics provided by the different fabric components, such as CPU, memory and/or network utilization metrics. If the storage fabric component was involved in the final list of suitable clusters, the cloud placement engine will implicitly select a candidate datastore since utilization metrics for the best datastore connected to each suitable cluster will have been provided by the fabric components along with the final list of suitable clusters. The cloud placement engine may use a placement selection algorithm 352 that is executed by one or processor associated with the cloud management server 106 to call on the different fabric components and select the candidate cluster and/or datastore for each client to be placed. In an embodiment, the same placement selection algorithm is executed for both initial placement problems and remediation placement problems. The placement selection algorithm may be a known placement selection algorithm, such as the placement selection algorithm provided in VMware vCloudDirector™, which is a product sold by VMware, Inc.

The placement controller 348 operates to initiate the cloud placement engine 350 to solve a placement problem when a placement request is received. When a new client needs to be placed in the cloud environment provided by the distributed computer system 100, an initial placement request is transmitted to the placement controller. The initial placement request may include specifications containing at least resource requirements and policies of the client to be placed. The initial placement request may be made by an administrator as a manual input or may be made by one or more components in the cloud management server 106 as part of an automated process. In response, the placement controller constructs an initial placement problem, which may contain the resource requirements and policies of the client and a set of clusters that are candidates for the initial placement of the client. The set of clusters contained in the initial placement problem may be all the clusters in the distributed computer system 100, or some subset of all the clusters that is derived from the information received along with the initial placement request. The placement controller then passes the initial placement problem to the client placement engine, which solves the initial placement problem in collaboration with the different fabric components and returns a placement solution, which includes the cluster and/or datastore to place the client.

Using the placement solution provided by the client placement engine 350, the placement controller executes the placement of the client at the determined placement indicated in the placement solution, which involves assistance from other components in the distributed computer system 100. In an embodiment, the placement controller invokes each of the fabric components to create the new client. In this embodiment, the selection of the host computer in the selected cluster to place the new client is determined by one or components in the cluster management server 110 of the selected cluster, e.g., the cluster resource management module 112.

Figure 4:
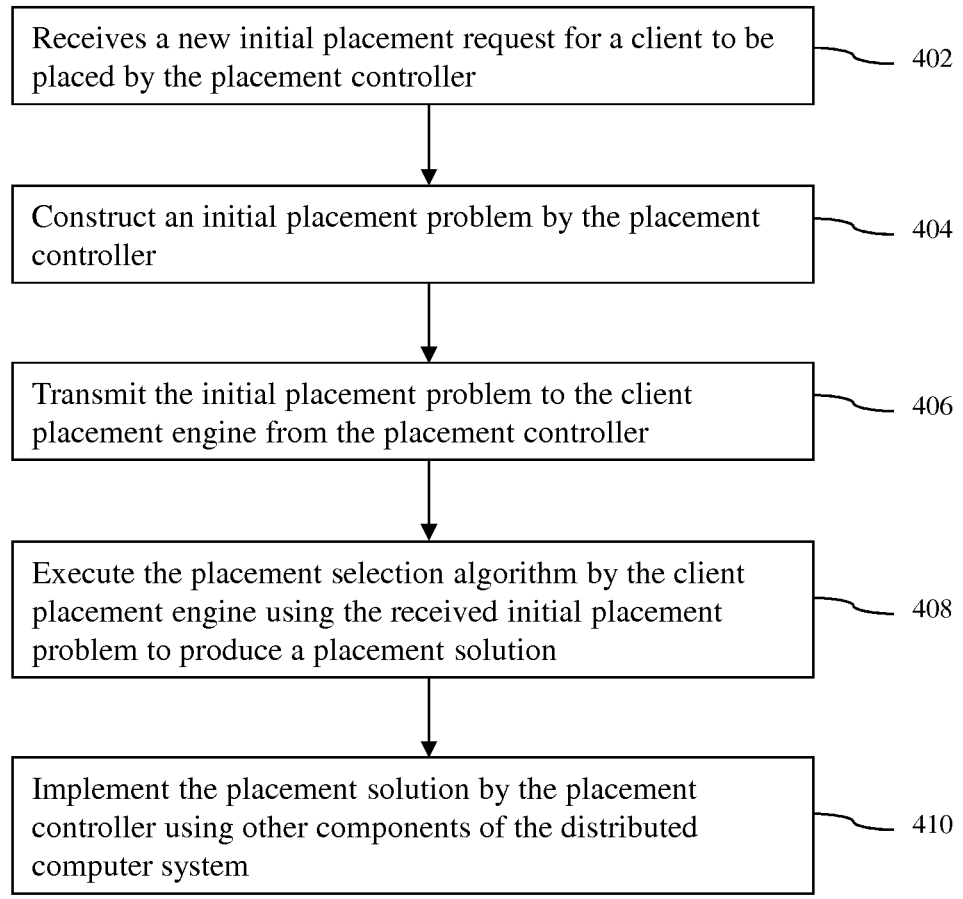
FIG. 4 is a flow diagram of an initial placement operation performed by the cloud placement module in accordance with an embodiment of the invention.

An initial placement operation performed by the cloud placement module 108 in accordance with an embodiment of the invention is described with reference to a flow diagram of FIG. 4. At block 402, a new initial placement request for a new client, e.g., a VM, are received by the placement controller 348. The new initial placement request includes specifications containing at least resource requirements and policies of the client. At block 404, an initial placement problem is constructed by the placement controller. The initial placement problem may contain the resource requirements and policies of the client and a set of suitable clusters that are possible candidates for the initial placement of the client. At block 406, the initial placement problem is transmitted to the client placement engine 350 from the placement controller. At block 408, the placement selection algorithm 352 is executed by the client placement engine using the received initial placement problem to produce a placement solution, e.g., a candidate cluster to place the client and/or a datastore for the client to be placed. In an embodiment, the placement selection algorithm calls on the different fabric components, i.e., the compute fabric component 340, the storage fabric component 342, the network fabric component 344 and the PBM fabric component 346, to receive a final list of suitable clusters along with utilization metrics for each resource. The placement selection algorithm then ranks the clusters in the final list of suitable clusters based on resource utilization metrics, such as CPU, memory and/or network utilization metrics. If the storage fabric component was involved in generating the final list of suitable clusters, the cloud placement engine will implicitly select a candidate datastore since utilization metrics for the best datastore connected to each suitable cluster will have been provided by the fabric components along with the final list of suitable clusters. At block 410, the placement solution is implemented by the placement controller using other components of the distributed computer system 100. In an embodiment, the placement controller invokes each of the fabric components to create the new client. In addition, as part of the process of creating the new client in the selected cluster, one or components in the cluster management server 110 of the selected cluster, e.g., the cluster resource management module 112, selects the host computer in the selected cluster to create the new client.

When an existing client needs to be moved from the current cluster and placed in another cluster in the distributed computer system 100 due to a remediation-requiring condition, a remediation placement request is transmitted to the placement controller 348. The remediation placement request can be made by one of the fabric components 340, 342, 344 and 346, the cluster resource management module (CRMM) 112 or the cluster storage resource management module (CSRMM) 114 from any of the clusters of host computers in the distributed computer system or even an administrator via a manual input.

In a first example, the cluster resource management module 112 of one of the clusters of host computers in the distributed computer system 100 may detect a remediation-requiring condition in the form of a cluster maintenance mode event and make a remediation placement request to move VMs out of that cluster. In this example, the cluster resource management module will make the subsequent placement request with a list of suitable clusters and a rule specifying anti-affinity for the cluster that is going into maintenance mode.

In a second example, the cluster storage resource management module 114 of one of the clusters of host computers in the distributed computer system 100 may detect a remediation-requiring condition in the form of a datastore or a datastore cluster maintenance mode event and make a remediation placement request to move VMs out of that cluster. In this example, the storage resource management module will make the remediation placement request with a list of suitable clusters and a rule specifying anti-affinity for the datastore or datastore cluster that is being evacuated.

In a third example, the PBM fabric component 346 may detect a remediation-requiring condition in the form of a policy violation, such as anti-affinity/affinity rule violation, for a VM and make a remediation placement request to move the VM out of the current cluster. In this example, the PBM fabric component will make the remediation placement request with a list of suitable clusters but without any specific additional rule since the policies of the VM can be looked up. When this remediation placement request is processed, the client placement engine 350 will automatically remediate the policy violation by choosing the right cluster, datastore and/or network matching the existing policies for the VM.

In a fourth example, the storage fabric component 342 may detect a remediation-requiring condition in the form of a storage class violation for a VM and make a remediation placement request to move the VM out of the current cluster. In this example, the storage fabric component will make the remediation placement request with candidate clusters but without any specific additional rule since the policies of the VM can be looked up. When this remediation placement request is processed, the client placement engine 350 will automatically remediate the policy violation by choosing the right datastore, as well as host computer and/or network matching the existing policies for the VM.

In a fifth example, the PBM fabric component 346 may detect a remediation-requiring condition in the form of a policy change made by a user using an interface with the cloud management server 106. In this example, the PMB fabric component will make remediation placement requests with lists of suitable clusters to apply the policy change to all the affected VMs.

In response to a remediation placement request, the placement controller 348 constructs a remediation placement problem for the client to be placed. The remediation placement problem may contain resource requirements and policies of the client, as well as current location of the client, e.g., the current cluster and/or the current datastore of the client. In some embodiments, the remediation placement problem may also contain the current workload of the client, which may be retrieved from the cluster management server 110 of the current cluster of the client. The resource requirements and policies of the client are known to the placement controller since the placement controller was involved when the VM was first provisioned via an initial placement process. The remediation placement problem is then passed to the client placement engine 350, which solves the remediation placement problem in collaboration with the different fabric components 340, 342, 344 and/or 346 and returns a placement solution, which includes the cluster and/or datastore to place the client for remediation. In order to generate the placement solution, the cloud placement engine runs the placement selection algorithm 352, which is the same algorithm used to generate a placement solution for an initial placement problem for a new client. In an embodiment, the placement selection algorithm takes into consideration the current location of the client when determining the appropriate placement solution, which may involve considering costs associated with migrating the client from the current location to the possible new locations. These migration costs may include the geographical distance between the current location of the possible new locations. As an example, the migration costs may be costs associated with using vMotion™ and/or Storage vMotion™, which are provided in VMware vSphere™ products sold by VMware, Inc., to move VMs and/or associated virtual disks. For Storage vMotion™, the entire contents of a virtual disk of a VM need to be sent over the network to the new location, which requires resource usage costs, such as bandwidth and processor resource costs. For Storage vMotion™, the state of the main memory, compute, devices, etc. of a VM need to be sent over the network to the new host, which also requires resource usage costs, such as bandwidth and processor resource costs. In addition, the placement selection algorithm may take into consideration the current workload of the client when determining the appropriate placement solution. Thus, the placement selection algorithm may select one suitable cluster over another suitable cluster based on current resource usages of the clusters due to the current large workload of the client. For example, if a VM has a large requirement for memory (e.g., 500 GB), then it is better to place the VM on a cluster which has more memory resource freely available. This will ensure that no particular cluster runs out of a particular resource like memory, CPU, etc.

Using the placement solution provided by the client placement engine 350 for the existing problematic client, the placement controller 348 initiates the placement of the client at the determined placement indicated in the placement solution. In an embodiment, the placement controller will initiate the process of migrating the client to the selected cluster and/or datastore from the current cluster and/or datastore. In this embodiment, the selection of the host computer in the selected cluster to place the existing problematic client is determined by one or components in the cluster management server of the selected cluster, e.g., the cluster resource management module 112. The actual migration process is performed by other components in the distributed computer system 100, such as components in the cloud management server 106 and the cluster management servers 110. In an implementation, the client is migrated to a new host computer and/or a new datastore using mechanisms provided by products sold by VMware Inc. As an example, a VM can be migrated to a new host computer of the selected cluster using vMotion™, which is provided in VMware vSphere™ products sold by VMware, Inc. As another example, a VM can be migrated to a new datastore connected to the selected cluster using Storage vMotion™, which is provided in VMware vSphere™ products sold by VMware, Inc. As another example, a VM can be migrated to a new host computer of the selected cluster and the new datastore connected to the selected cluster using a feature provided in VMware vSphere™ products sold by VMware, Inc. In addition, a VM can be migrated from one virtual datacenter to another datacenter using another feature provided in VMware vSphere™ products sold by VMware, Inc. Once the client has been migrated to the new host computer and/or the new datastore, the mediation of the client is now complete.

Figure 5:
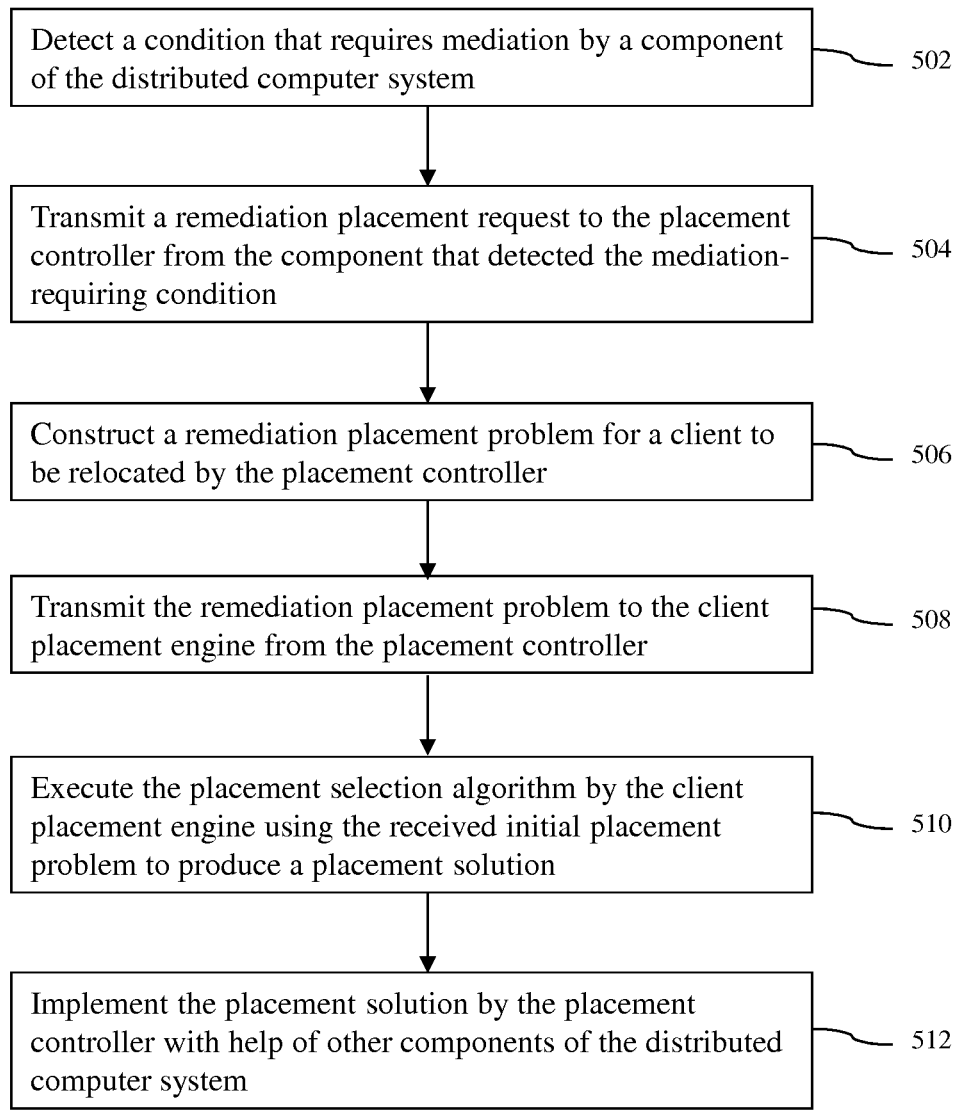
FIG. 5 is a flow diagram of a remediation placement operation performed by the cloud placement module in accordance with an embodiment of the invention.

A remediation placement operation of the cloud placement module 108 in accordance with an embodiment of the invention is described with reference to a flow diagram of FIG. 5. At block 502, a condition that requires mediation is detected by a component of the distributed computer system 100. In some situations, the mediation-requiring condition may be detected by more than one component of the distributed computer system. The components of the distributed computer system that can detect one or more mediation-required conditions may include the fabric components of the cloud placement module, e.g., the compute fabric component 340, the storage fabric component 342, the network fabric component 344, the PBM fabric component 346 and the cluster resource management modules 112 and the cluster storage resource management modules 114 in the cluster management servers 110. At block 504, a remediation placement request is transmitted to the placement controller 348 from the component that detected the mediation-requiring condition. Depending on the mediation-requiring condition, the remediation placement request may include additional information, such as a list of potential clusters for the client to be placed and one or more rules specifying constraints for the client with respect to clusters and/or datastores. At block 506, a remediation placement problem is constructed by the placement controller. The remediation placement problem may contain the resource requirements and policies of the client to be relocated and a set of clusters that are suitable for the placement of the client. The remediation placement problem may further contain the current location and/or the current workload of the client to be relocated. At block 508, the remediation placement problem is transmitted to the client placement engine 350 from the placement controller. At block 510, the placement selection algorithm 352 is executed by the client placement engine using the received remediation placement problem to produce a placement solution, e.g., a different cluster to relocate the client and/or a different datastore for the client to be relocated. In an embodiment, similar to the initial placement process, the placement selection algorithm calls on the different fabric components, i.e., the compute fabric component 340, the storage fabric component 342, the network fabric component 344 and the PBM fabric component 346, to receive a final list of suitable clusters along with utilization metrics for each resource. The placement selection algorithm then ranks the clusters in the final list of suitable clusters based on resource utilization metrics, such as CPU, memory and/or network utilization metrics. If the storage fabric component was involved in generating the final list of suitable clusters, the cloud placement engine will implicitly select a candidate datastore since utilization metrics for the best datastore connected to each suitable cluster will have been provided by the fabric components along with the final list of suitable clusters. At block 512, the placement solution is implemented by the placement controller with help from other components of the distributed computer system. In an embodiment, the placement controller initiates the process of client migration to the candidate cluster and/or datastore. The determination and placement of the client in a new host computer of the selected cluster will occur during the migration process. The actual migration process is performed by other components in the distributed computer system, such as components in the cloud management server and the cluster management servers.

In an alternative embodiment, the cloud placement engine 350 may be configured to not only select the candidate cluster to place a new client or to relocate an existing client in the distributed computer system, but may also be configured to selected a host computer in the candidate cluster to place the new or existing client. This selection of the host computer may be executed by the placement selection algorithm 352 or may be executed by one or more components in the cluster management server 110 of the candidate cluster, such as the cluster resource management module 112 in the candidate cluster, at the request of the cloud placement engine.

Figure 6:
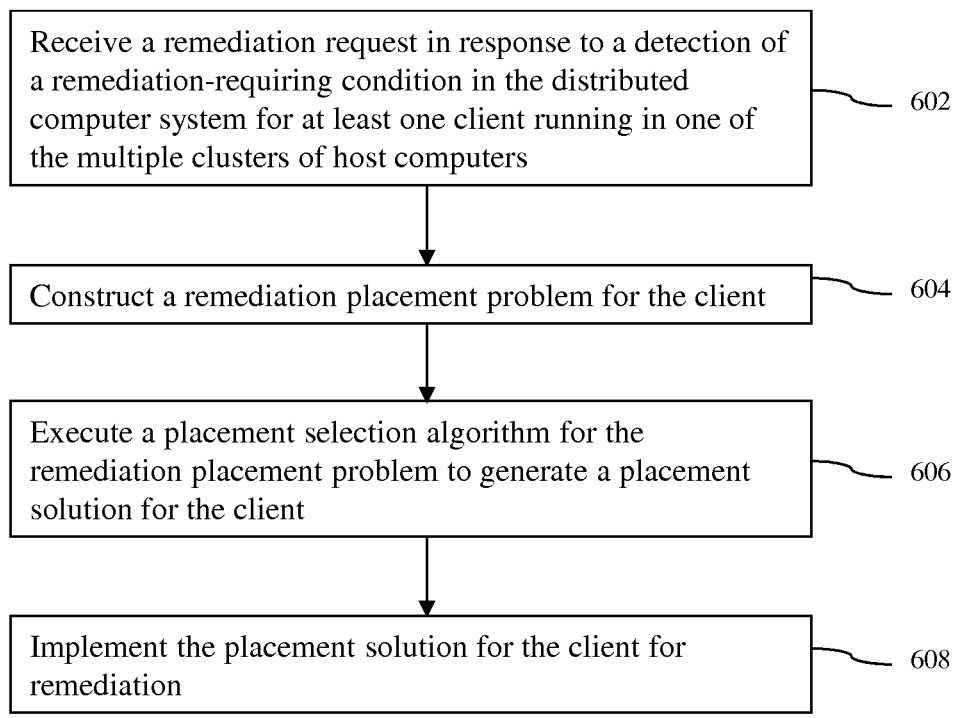
FIG. 6 is a flow diagram of a method for performing automatic remediation in a distributed computer system with multiple clusters of host computers in accordance with an embodiment of the invention.

A method for performing automatic remediation in a distributed computer system with multiple clusters of host computers in accordance with an embodiment of the invention in accordance with an embodiment of the invention is described with reference to a flow diagram of FIG. 6. At block 602, a detection of a remediation-requiring condition in the distributed computer system for at least one client running in one of the multiple clusters of host computers is received. At block 604, a remediation placement problem for the client is constructed. At block 606, a placement selection algorithm is executed for the remediation placement problem to generate a placement solution for the client. The placement selection algorithm is the same placement selection algorithm used for initial placements of new clients in the distributed computer system. At block 608, the placement solution for the client is implemented for remediation.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing automatic remediation in a distributed computer system with multiple clusters of host computers, the method comprising:
    receiving a remediation request in response to a detection of a remediation-requiring condition in the distributed computer system for a client running in one of the multiple clusters of host computers;
    constructing a remediation placement problem for the client;
    executing a placement selection algorithm for the remediation placement problem to generate a placement solution for the client, the placement selection algorithm being the same placement selection algorithm used for initial placements of new clients in the distributed computer system; and
    implementing the placement solution for the client for remediation,
    wherein the remediation-requiring condition in the distributed computer system is detected by one of a compute fabric component, a storage fabric component, a network fabric component and a policy based management (PBM) fabric component and
    wherein the remediation-requiring condition is one of a storage class violation for the client in one of the multiple clusters in the distributed computer system detected by the storage fabric component and a policy change for the distributed computer system detected by the PBM fabric component.

2. The method of claim 1 wherein the remediation-requiring condition is a policy violation for the client in one of the multiple clusters in the distributed computer system detected by the PBM fabric component.

3. The method of claim 1, wherein the remediation-requiring condition in the distributed computer system is detected by any of cluster resource management modules or cluster storage resource management modules in the multiple clusters in the distributed computer system.

4. The method of claim 3, wherein the remediation-requiring condition is a cluster maintenance mode event for a particular cluster in the distributed computer system detected by a corresponding cluster resource management module of the particular cluster.

5. The method of claim 3, wherein the remediation-requiring condition is a maintenance mode event for a datastore or a cluster of datastores in the distributed computer system detected by a corresponding cluster storage resource management module.

6. The method of claim 1, wherein the placement selection algorithm takes into consideration a current location of the client to generate the placement solution.

7. The method of claim 6, wherein the placement selection algorithm takes into consideration a current workload of the client to generate the placement solution.

8. The method of claim 1, wherein the placement solution generated by the placement selection algorithm includes a cluster and/or a datastore in the distributed computer system to relocate the client.

9. A cloud management server for a distributed computer system comprising:
   memory;
   a processor configured to execute one or more codes in the memory to implement software modules including:
   a cloud placement engine configured to generate placement solutions for clients to be placed in clusters of host computers in the distributed computer system using a placement selection algorithm in response to received placement problems, the placement selection algorithm being the same placement selection algorithm used for initial placements of new clients into the distributed computer system and for remediation placements of existing clients in the distributed computer system;
   a placement controller operably connected to the cloud placement engine, the placement controller being configured to:
      receive a remediation request in response to a detection of a remediation-requiring condition in the distributed computer system for a client running in one of the clusters of host computers;
      construct a remediation placement problem for the client to be solved by the cloud placement engine; and
      implement a placement solution for the remediation placement problem provided by the cloud placement engine for remediation: and
   at least one of a compute fabric component, a storage fabric component, a network fabric component and a policy based management (PBM) fabric component that are configured to detect remediation-requiring conditions and send corresponding remediation requests to the placement controller,
   wherein the storage fabric component is configured to detect the remediation-requiring condition, the remediation-requiring condition being a storage class violation for the client in one of the multiple clusters in the distributed computer system, or
   wherein the PBM fabric component is configured to detect the remediation-requiring condition, the remediation-requiring condition being a policy change for the distributed computer system.

10. The server of claim 9, wherein the PBM fabric component is configured to detect the remediation-requiring condition, the remediation-requiring condition being a policy violation for the client in one of the multiple clusters in the distributed computer system detected.

11. The server of claim 9, wherein the placement controller is configured to receive the remediation request from any of cluster resource management modules or cluster storage resource management modules in the multiple clusters in the distributed computer system.

12. The server of claim 11, wherein the placement controller is configured to receive the remediation request from a cluster resource management module in a particular cluster of the distributed computer system, the remediation-requiring condition being a cluster maintenance mode event for the particular cluster.

13. The server of claim 11, wherein the placement controller is configured to receive the remediation request from a cluster storage resource management module in a particular cluster of the distributed computer system, the remediation-requiring condition being a maintenance mode event for a datastore or a cluster of datastores associated with the particular cluster.

14. The server of claim 9, wherein the placement selection algorithm executed by the cloud placement engine is configured to take into consideration a current location of the client to generate the placement solution.

15. The server of claim 14, wherein the placement selection algorithm executed by the cloud placement engine is configured to take into consideration a current workload of the client to generate the placement solution.

16. The server of claim 9, wherein the placement solution generated by the placement selection algorithm includes a cluster and/or a datastore in the distributed computer system to relocate the client.

17. A non-transitory computer-readable storage medium containing program instructions for automatic remediation in a distributed computer system with multiple clusters of host computers, wherein execution of the program instructions by one or more processors of a computer system causes the one or more processors to perform steps comprising:
   receiving a remediation request in response to a detection of a remediation-requiring condition in the distributed computer system for a client running in one of the multiple clusters of host computers;
   constructing a remediation placement problem for the client;
   executing a placement selection algorithm for the remediation placement problem to generate a placement solution for the client, the placement selection algorithm being the same placement selection algorithm used for initial placements of new clients in the distributed computer system; and
   implementing the placement solution for the client for remediation,
   wherein the remediation-requiring condition in the distributed computer system is detected by one of a compute fabric component, a storage fabric component, a network fabric component and a policy based management (PBM) fabric component and
   wherein the remediation-requiring condition is one of a storage class violation for the client in one of the multiple clusters in the distributed computer system detected by the storage fabric component and a policy change for the distributed computer system detected by the PBM fabric component.

18. The non-transitory computer-readable storage medium of claim 17, wherein the remediation-requiring condition is a policy violation related to the client in one of the multiple clusters in the distributed computer system.

19. The non-transitory computer-readable storage medium of claim 17, wherein the remediation request is made by any of cluster resource management modules or cluster storage resource management modules in the multiple clusters in the distributed computer system after the remediation-requiring condition in the distributed computer system is detected.

20. The non-transitory computer-readable storage medium of claim 19, wherein the remediation-requiring condition is a cluster maintenance mode event for a particular cluster in the distributed computer system or a maintenance mode event for a datastore or a cluster of datastores in the distributed computer system.

21. The non-transitory computer-readable storage medium of claim 17, wherein the placement solution generated by the placement selection algorithm includes a cluster and/or a datastore in the distributed computer system to relocate the client.

* * * * *